United States Patent
Kim et al.

(10) Patent No.: US 6,659,757 B2
(45) Date of Patent: Dec. 9, 2003

(54) VALVE FOR INJECTION MOLDING

(75) Inventors: Roland Y. Kim, Andover, MA (US); Theodore A. Burnham, Melrose, MA (US)

(73) Assignee: Trexel, Inc., Woburn, MA (US)

( * ) Notice: Subject to any disclaimer, the term of this patent is extended or adjusted under 35 U.S.C. 154(b) by 0 days.

(21) Appl. No.: 10/401,480

(22) Filed: Mar. 28, 2003

(65) Prior Publication Data

US 2003/0164462 A1 Sep. 4, 2003

Related U.S. Application Data

(63) Continuation of application No. 09/710,756, filed on Nov. 10, 2000
(60) Provisional application No. 60/242,866, filed on Oct. 24, 2000.

(51) Int. Cl.[7] .............................................. B29C 47/00
(52) U.S. Cl. ..................... 425/376.1; 425/522; 425/542; 251/63.4; 251/77
(58) Field of Search ........................ 425/376.1, 522, 425/542; 251/63.4, 77, 129.14, 129.19, 318, 324, 325

(56) References Cited

U.S. PATENT DOCUMENTS

| | | | |
|---|---|---|---|
| 1,769,910 A | | 7/1930 | Ponsonby |
| 2,090,232 A | | 8/1937 | Ritz |
| 3,025,871 A | * | 3/1962 | Roth et al. ............. 251/63.4 X |
| 3,410,304 A | * | 11/1968 | Paul, Jr. ................. 251/63.4 X |
| 3,646,958 A | | 3/1972 | Braas |
| 3,765,644 A | | 10/1973 | Zeuner |
| 3,807,689 A | | 4/1974 | Booth |
| 3,845,932 A | * | 11/1974 | Fontaine ..................... 251/63.4 |
| 3,917,779 A | * | 11/1975 | Breer et al. ................ 264/46.5 |
| 4,008,035 A | * | 2/1977 | Korostoff et al. ..... 425/376.1 X |
| 4,071,025 A | * | 1/1978 | Kohnke .................. 251/367 X |
| 4,280,661 A | | 7/1981 | Tanasawa et al. |
| 4,291,860 A | | 9/1981 | Bauer |
| 4,473,665 A | | 9/1984 | Martini-Vvedensky et al. |
| 4,526,323 A | | 7/1985 | Seifert |
| 4,592,533 A | * | 6/1986 | Guglielmi et al. ........ 251/77 X |
| 4,601,864 A | | 7/1986 | Vreenegoor |
| 4,610,264 A | * | 9/1986 | Georgiev et al. ...... 251/63.4 X |
| 5,114,055 A | * | 5/1992 | Worth ..................... 251/214 X |
| 5,158,986 A | | 10/1992 | Cha et al. |
| 5,160,674 A | | 11/1992 | Colton et al. |
| 5,334,356 A | | 8/1994 | Baldwin et al. |
| 5,419,492 A | | 5/1995 | Gant et al. |
| 5,494,078 A | * | 2/1996 | Schulte .................. 251/63.4 X |
| 5,866,053 A | | 2/1999 | Park et al. |
| 6,005,013 A | | 12/1999 | Suh et al. |
| 6,105,596 A | | 8/2000 | Hoyes et al. |
| 6,169,122 B1 | | 1/2001 | Blizard et al. |
| 6,231,942 B1 | | 5/2001 | Blizard et al. |
| 6,235,380 B1 | | 5/2001 | Tupil et al. |
| 6,284,810 B1 | | 9/2001 | Burnham et al. |
| 6,322,347 B1 | | 11/2001 | Xu |
| 6,376,059 B1 | | 4/2002 | Anderson et al. |

FOREIGN PATENT DOCUMENTS

WO        WO 98-31521        7/1998

* cited by examiner

Primary Examiner—Gene Mancene
Assistant Examiner—Eric Keasel
(74) Attorney, Agent, or Firm—Wolf, Greenfield & Sacks, P.C.

(57) ABSTRACT

A valve for controlling the flow of a high pressure fluid is provided. The valve provides a reliable way of controlling the flow of high pressure fluids in applications requiring multiple cycles where equipment may be exposed to environmentally harsh conditions, such as high temperatures and pressures.

15 Claims, 4 Drawing Sheets

VALVE FOR INJECTION MOLDING

RELATED APPLICATIONS

This application is a continuation of U.S. application Ser. No. 09/710,756, filed Nov. 10, 2000, by Kim et al., titled "Valve for Injection Molding," which claims priority to U.S. Provisional Application Serial No. 60/242,866, filed Oct. 24, 2000, by Kim et al., titled "Valve for Injection Molding," the disclosures of which application are incorporated herein by reference.

FIELD OF THE INVENTION

The present invention is directed to a valve for controlling the flow of a high pressure fluid and, in particular, a valve for use in high cycle polymer operations.

BACKGROUND OF THE INVENTION

The flow control of high pressure fluids is important in a variety of industries, including manufacturing, chemical production, refrigeration, plastics molding, automotive and medical applications. In the plastics molding industry, for example, fluids are often transferred at temperatures of several hundred degrees F and at pressures of several thousand psi.

In several methods of polymer production, described in International Publication No. WO 98/31521 (Pierick et. al.), International Publication No. WO 99/32544 (Anderson et. al.), and International Publication No. WO 98/08667 (Burnham, et. al.), each of which is hereby incorporated by reference herein, a gas blowing agent is mixed with a molten polymer to produce a mixture of gas and polymer. These processes may be used to produce, for example, injection molded, blow molded or extruded polymeric materials. Typically, a high pressure gas is injected and mixed with a molten polymer prior to the polymer being molded or extruded. Certain processes, e.g. injection molding, involve producing product cyclically, e.g., with many parts being made sequentially in the same mold. In such cases it may be preferred that the high pressure gas can be isolated from the polymer stream during the time the polymer is being transferred to a mold.

High pressure fluid valves used in cyclic operations are typically subjected to strenuous mechanically harsh conditions. It is one goal of the invention to provide a robust high-pressure valve for such use.

SUMMARY OF THE INVENTION

In one aspect, the invention provides a valve comprising a valve seat, a valve pin having a drive end and a sealing end, the valve pin mounted in the valve such that the sealing end is capable of mating with the valve seat, and a packing washer supporting the valve pin, the packing washer having a first end and a second end. An internal diameter of the packing washer varies between the first end and the second end.

In another aspect, the invention provides a valve comprising a valve seat positioned in a valve body, a valve pin positioned in the valve body, the valve pin having a sealing end and a drive end. The sealing end is capable of mating with the valve seat to prevent flow of fluid through the valve. A piston stem is positioned in a housing, the piston stem having a first end and a second end and capable of transferring axial force to the valve pin. The piston stem is uncoupled from the valve pin.

In another aspect, the invention provides a valve comprising a valve seat positioned in a valve body, a valve pin positioned in the valve body. The valve pin has a sealing end and a drive end. The sealing end is configured to mate with the valve seat to prevent flow of fluid through the valve. An energized seal surrounds a portion of the valve pin, and prevents flow of fluid past the seal.

In another aspect, the invention provides a valve comprising a valve seat, a valve pin capable of forming a fluid-tight seal with the valve seat, and a valve pin guide adjacent the valve seat. The valve pin guide has an internal diameter that is substantially the same as the outer diameter of the valve pin.

In another aspect, the invention provides a valve comprising a valve seat mounted in a valve body, and a valve pin having a sealing end and a drive end. The valve pin is slidably mounted in the valve body and axially movable between a first position wherein the sealing end is mated with the valve seat and a second position wherein fluid can flow through the valve. A valve guide is positioned adjacent to the valve seat, and an energized seal surrounds a portion of the valve pin. A piston stem moves the valve pin from the second position to the first position, and the piston stem is capable of transmitting axial force to the valve pin while permitting the axis of the piston stem to move independently of the axis of the valve pin.

In another aspect, the invention provides a system comprising any of the above valves in communication with a polymeric foam processing apparatus such as extrusion, injection molding, or blow molding apparatus.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

Figure 1:
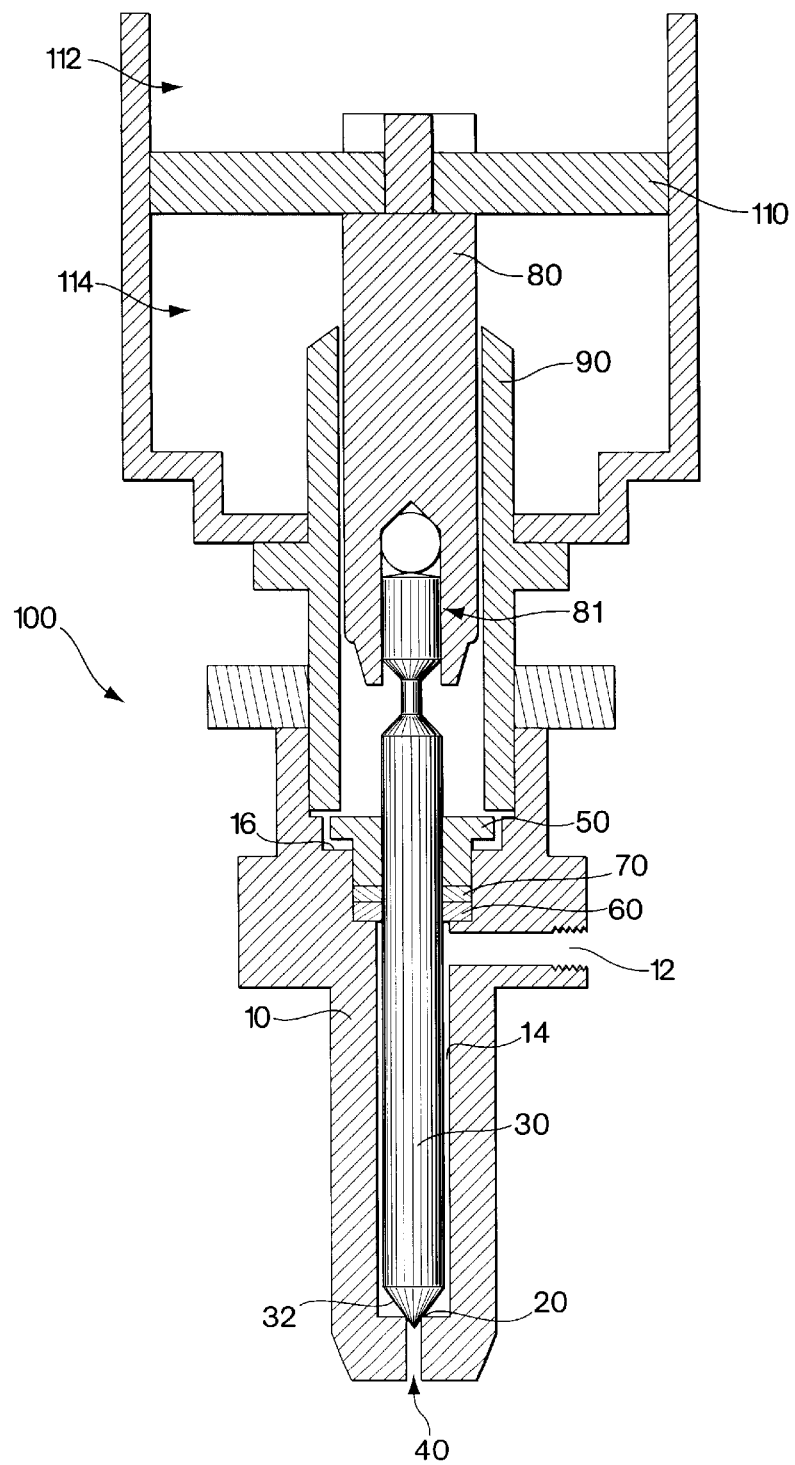
FIG. 1 illustrates in cross section a prior art gas injection valve.

An example of a typical prior art valve used to control the flow of a high pressure fluid, such as compressed nitrogen, into a polymer mix, is illustrated in FIG. 1. This description is not meant to imply that other, similar arrangements are not present in the prior art. The valve includes a valve body 10 having a valve seat 20 supported in the valve body. Valve pin 30 is slidably mounted in the valve body 10 so that the sealing end 32 of the valve pin can mate with valve seat 20 and prevent the flow of gas through the valve body and out of gas exit 40 that may lead to a polymeric foam processing system. The diameter of the valve pin is uniform until the conical taper at the sealing end, and the internal diameter of the valve body is uniform throughout. Typically, the difference between these two diameters is large enough, at least 0.03 inch, to allow an adequate flow of compressed gas between the valve pin 30 and the interior of the valve body 10 when the valve is opened. The valve seat may be composed of 316 SS and the valve pin of 17-4 hardened steel. Although, in all embodiments described herein, the valve of the invention is described as being able to prevent the flow of fluid in one position, while allowing fluid to flow in another position, the valve can easily be modified by those of ordinary skill in the art with the benefit of the present disclosure to inhibit (although not completely prevent) the flow of fluid in the first position while allowing fluid to flow in the second position. The valve can easily be constructed to allow for control of fluid flow between and among essentially any fluid flow levels from complete prevention of fluid flow to free fluid flow in the valve's completely "open" position. Accordingly, in all embodiments, the valve can allow a first level of fluid flow in a first position and a second level of fluid flow (different from the first level of flow) in a second position. Either of the first or second levels of fluid flow can define complete prevention of fluid flow.

Valve pin 30 is supported in the valve body by upper washer 50, lower washer 60 and fluoropolymer seal 70. Upper washer 50 is adjustable via nut 55 and serves to compress seal 70 between upper washer 50 and lower washer 60. The internal diameter of upper washer 50 is consistent and is designed to close tolerances to precisely guide valve pin 30 as the valve pin slides to open and close the valve. For example, the internal diameter of upper washer 50 can be less than 0.0005 inch greater than the diameter of valve pin 30. Thus, upper washer 50 may be used to align and direct valve pin 30.

Valve pin 30 is swaged to piston stem 80 at junction 81 so that any movement to piston stem 80 is translated to valve pin 30. Thus, if piston stem 80 moves downward (referring to FIG. 1), valve pin 30 also moves downward, to a position where sealing end 32 mates with valve seat 20 to form a pressure tight seal. If piston stem 80 moves upward, valve pin 30 is pulled away from valve seat 20 and gas may flow through inlet 12, through valve body cavity 14 between the wall of the cavity and the valve pin, through a gate between pin sealing end 32 and valve seat 20, and through exit 40 that is in communication with a polymeric foam processing system. Thus, by controlling the movement of piston 110 by supplying compressed air to either chamber 112 or chamber 114, the movement of piston stem 80, and therefore valve pin 30, is controlled. When the valve is to be closed, compressed air is directed to chamber 112. When the valve is to be opened, compressed air is fed to chamber 114.

When high pressure gas is injected through inlet 12 into the valve body, it is important for the system to be sealed to prevent the escape of high pressure gas. This can be facilitated to some extent via PTFE seal 70 placed around valve pin 30 to form a seal between the inner wall of valve body 10 and valve pin 30. As the PTFE seal may start to "cold flow" or "creep," upper washer 50 can be tightened and thereby compressed against adjustable seal 70, to expand the seal in order to minimize leakage past the seal. When the seal has flowed to such an extent that it is no longer capable of sealing, it can be replaced. PTFE is a material that can provide a seal and allow the reciprocation of valve pin 30 between the open and closed positions. Reciprocation may typically involve a travel distance of 0.125 inch or greater.

The valve illustrated in FIG. 1 may work adequately in a high pressure polymeric foam processing system, however, it also may fail after about 20,000 cycles, defining a limited lifetime. Not only does seal 70 require repeated tightening and replacement, but an elliptical hole can become worn into valve seat 20, thus allowing gas to escape past the seat through exit 40 when the valve is in the closed position. When used with a polymeric foam processing system, this is disadvantageous as high pressure gas is allowed to pass through the processing system when downstream gates are opened. Frequent replacement of the valve seat may be required with the system of FIG. 1.

The inventors have found several reasons that may contribute to the premature failure of the prior art valve of FIG. 1. For example, as the adjustable seal 70 flows and is repeatedly tightened, the thickness of the seal begins to decrease. At this point, the upper washer 50 may contact the interior surface of valve body 10 and become misaligned, as shelf 16 is typically not exactly perpendicular to the axis of valve pin 30. This means that the bore of upper washer 50 may no longer be properly aligned with the axial movement of valve pin 30, and because valve pin 30 is carefully fit into upper washer 50 at very low tolerances, any change in this angle forces the valve pin away from center so that conical valve tip 32 is no longer axially aligned with valve seat 20. As conical valve tip 20 is cycled repeatedly off center, it begins to unevenly wear an edge of valve seat 20 where the valve pin first comes into contact with the valve seat upon closure. In addition, because valve pin 30 is swaged to piston stem 80, any change in the angle of direction of movement of piston stem 80 urges a similar change in the motion of valve stem 30, resulting in additional forces that can result in misalignment between valve pin 30 and valve seat 20. Thus, the overall rigidity of the valve components, previously thought to provide a repeatable, long-lasting system capable of maintaining alignment under high pressure and high temperature conditions, actually contributes to the valve pin misalignment and the resulting failure of the valve itself.

Figure 2:
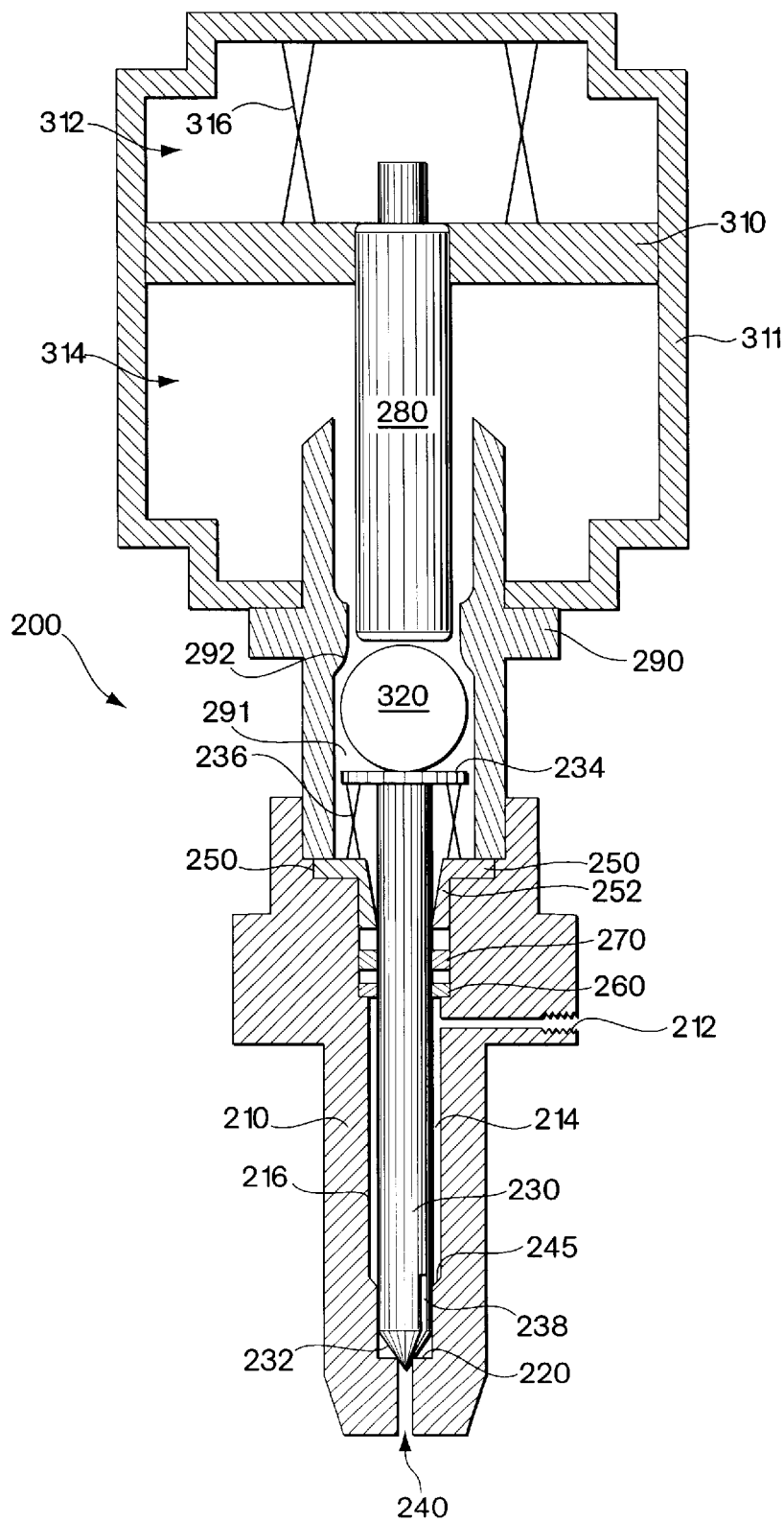
FIG. 2 illustrates in cross section one embodiment of a fluid injection valve according to the invention.

The present invention provides a valve that has been shown to provide consistent sealing of high pressure fluid through more than 20,000 cycles of an injection molding system without the need to adjust seals or change valve seats. Preferred valves of the invention can provide consistent sealing through 100,000, 500,000, 1 million, 2 million, or greater than 2.5 million cycles. One embodiment of the invention is provided in FIG. 2. FIG. 2 provides an illustration of an embodiment of a fluid control valve 200 that can control the flow of fluids, including gases and supercritical fluids, and provide consistent repeatable cycling at temperatures of at least about 650° F. and pressures greater than 6,000 psi. Valve 200 includes a valve pin 230, a valve seat 220 shaped to receive a sealing end 232 of the pin, a piston stem 280, a piston 310 operatively linked to the stem and moveable within a cylinder 311, and a ball 320 positioned to transfer a force from stem 280 to pin 230. Valve pin 230, which can be cylindrical, can be composed of a temperature robust material, e.g., a metal or alloy such as tungsten carbide, and has a sealing end 232 designed to mate with valve seat 220 and a drive end 234 opposite to sealing end 232. Sealing end 232 may be any shape that can form a fluid type seal when in contact with seat 220 and may be conical, as shown in FIG. 2, or, for example, can be hemispherical. In operation, sealing end 232 slides into a valve guide 245, which may be a section of chamber 214 that is narrower than is the section above it.

Valve guide 245 may be designed to close tolerances, with very little clearance between valve pin 230 and the walls of valve guide 245. The guide may be an integral part of valve body 210 or, alternatively, may be a separate insert. Preferably, the inner diameter of valve guide 245 is substantially the same as the diameter of valve pin 230. Valve guide 245 may extend up to the full length of interior surface 216, but it is preferred that the valve guide be as short as possible while still constraining valve pin 230 when valve pin 230 is fully withdrawn from valve seat 220. In this way, resistance to fluid flow between inlet 212 and outlet 240 is minimized, as is friction between valve pin 230 and valve guide 245. In this manner, sealing end 232 is maintained in proper alignment with valve seat 220 due to the close tolerances between valve guide 245 and valve pin 230.

In order to ease the passage of high pressure fluid through inlet 212 to chamber 214 and out of exit 240 when the valve pin is in the upper, or open position, especially when valve guide 245 is present, fluid channels may be provided within or proximate the valve guide. One or more channels may be formed in the interior wall of valve guide 245, for example, by using EDM techniques known to those skilled in the art, or, alternatively, one or more shapes, such as flats or concavities, may be machined into the surface of valve pin 230 in the area of end 232. For example, flat 238 may be machined into valve pin 230 to provide a fluid pathway between valve pin 230 and valve guide 245. Preferably, two or more flats are symmetrically opposed to each other.

Opposite of end 232 of valve pin 230 is drive end 234 which may include a broadened contact area as illustrated in FIG. 2, the surface of which may be either flat, as illustrated in FIG. 2 or, alternatively, concave or convex. Shown just above drive end 234 is ball 320 which may be made out of any suitable material, including tungsten carbide or hardened steel. Ball 320 serves as a point source to transfer force from piston stem 280 to the drive end of valve pin 230. Piston stem 280 may be driven by any device capable of providing force, including a pneumatic piston, as illustrated in FIG. 2, a hydraulic piston, or an electrically powered actuator. Ball 320 may be contained between piston stem 280 and valve pin 230 without being affixed to either of the components with which it makes contact. In this manner, when piston stem 280 is withdrawn, ball 320 may move freely upward until retained by a stop, such as shoulder 292. In alternative embodiments, the ball, or another point source, may form an integral part of either piston stem 280 or valve pin 230, without being affixed to the other. It is preferable, however, that force be transferred from piston stem 280 to valve pin 230 via a point source and that piston stem 280 and valve pin 230 not be fixed together. In this manner, if piston stem 280 should become out of axial alignment with valve pin 230, or if a point source on either one of the components should move off center, the driving force may still be cleanly transferred from piston stem 280 to valve pin 230 without applying undue torque to valve pin 230 that might cause premature wear toward one side of valve seat 220. The implementation of a stop, such as shoulder 292, provides for a preferred amount of minimal travel for valve pin 230 while not requiring precise, limited movement of piston stem 280. The stop may be positioned to limit the travel of the valve pin directly or can be positioned to limit the travel of the ball 320 which, in turn, limits the travel of valve pin 230.

Valve pin 230, in conjunction with lower washer 260, energized seal 270, and packing washer 250, forms a fluid-tight seal to prevent flow of fluid into cavity 291, which may be fluidly connected to the environment outside of the valve. Bottom washer 260 may be of any size and shape appropriate for retaining seal 270 inside chamber 214. A gland 290 is used to hold packing washer 250 in place.

Figure 3:
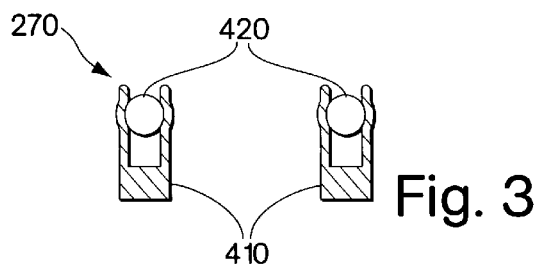
FIG. 3 illustrates in cross section an enlarged view of a seal of the fluid injection valve illustrated in FIG. 2.

Energized seal 270 can be a nonadjustable seal that can form a fluid tight seal without external forces being applied to the top or bottom of the seal. Energized seal 270 can be, for instance, a "V" seal providing a sealing surface for both the interior and exterior of the seal. The energized seal should allow for the reciprocating movement of valve pin 230 without allowing the passage of significant quantities of high pressure fluid. Energized seal 270, shown in cross-section in FIG. 3, may contain a spring 420 that provides an expanding force that serves to both push the outer edge of energized seal 270 into contact with interior surface 216 and also push the inner edge of energized seal 270 into contact with the wall of valve pin 230. Spring 420 may be any resilient substance that, in compression, provides an outward force. Preferably, spring 420 is a toroidal spring that forms a circle within the cylindrical seal. The contacting portion 410 of the energized seal that is in contact with either the surface of the valve pin 230 or the inner wall of valve body 210 can be made out of any material capable of forming a fluid-tight seal under the high temperature and high pressure conditions encountered in the process with which the seal is used. Preferably, energized seal 270 is comprised of heat resistant elastomer, and more preferably is polymer/PTFE. In one embodiment, a seal from Parker GNP, referred to as type HS-11-008-S-106, has been shown to provide acceptable results after 2.7 million cycles.

Packing washer 250 may be a flanged washer, as shown in FIG. 2, and may serve to retain energized seal 270 as well as to center and align valve pin 230. Preferably, the inner bore of packing washer 250, through which valve pin 230 passes, is of different diameter at the upper end than at the lower end. For example, the lower end of packing washer 250 may have an inner diameter very close to the diameter of the valve pin, and the upper end of packing washer 250 may have an inner diameter several thousandths of an inch wider. This configuration still allows the packing washer to help center valve pin 230. The variation in diameter, however, provides enough freedom of movement that any misalignment between packing washer 250 and valve pin 230 will not result in a force that pushes valve pin 230 out of alignment with valve seat 220. This design helps to resolve the problem encountered with the valve of FIG. 1 where any misalignment of the upper washer 50 tended to force the valve pin offline and to wear an elliptical hole in valve seat 20. In a most preferred embodiment, the inner diameter of packing washer 250 is tapered at about 1.2° (exaggerated in FIGS. 2, 4 and 5), and more preferably, the inner diameter is smaller at the bottom of the washer and larger at the top, although a reverse taper could function similarly.

Valve 200 can also include a compression spring 236 providing an upward force to remove valve pin 230 from valve seat 220 when piston stem 280 is retracted, especially when stem 280 and pin 230 are not affixed to each other, i.e. not operatively linked to cause retraction of pin 230 when stem 280 is retracted. The compression spring may be any type of spring capable of providing a force to open the valve and may be made of, for example, metal, polymer or resilient elastomer that is robust enough to withstand the environmental rigors of the application with which it is being used. Preferably, the reciprocal movement of valve pin 230 is limited to less than about 0.1 inch and more preferably is in the range of 0.01 to 0.1 inch. In a most preferred embodiment, valve pin 230 moves approximately 0.050 inch between the open and closed positions, the length of travel being controlled by shoulder 292.

Figure 4:
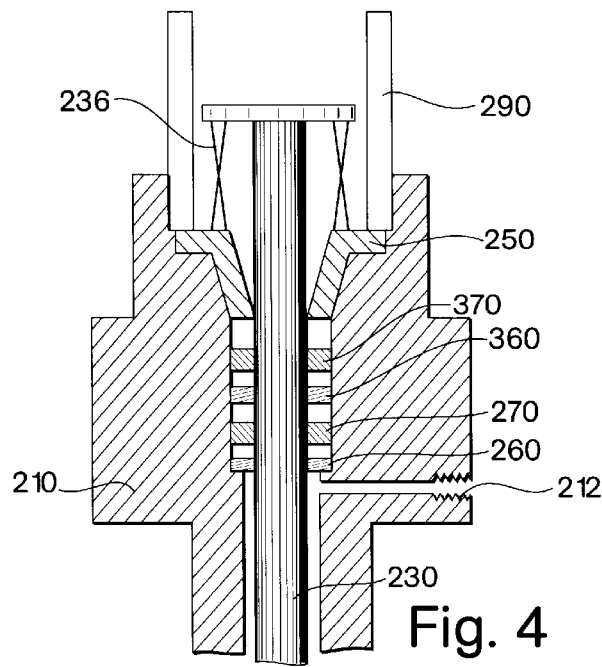
FIG. 4 illustrates in cross section, an enlarged view of the seal area of an embodiment of the invention.

In another embodiment, illustrated in FIG. 4, additional seals may be utilized to further isolate the high pressure fluid entering through inlet 212 from cavity 291 and from the environment external to the valve. In addition to lower washer 260 and energized seal 270, additional seals either upstream or downstream from the initial seal may be added to make a more robust valve. The seals may be placed back to back or, alternatively, as shown in FIG. 4, a spacer such as intermediate washer 360 may be positioned between initial seal 270 and secondary seal 370. Secondary seal 370 may be identical to initial seal 270 or may be of a different design and different material. Appropriate materials may include polytetrafluoroethylene (PTFE) and synthetic rubber, such as that sold under the trademark VITON® (DuPont Dow Elastomers, L.L.C.).

Figure 5:
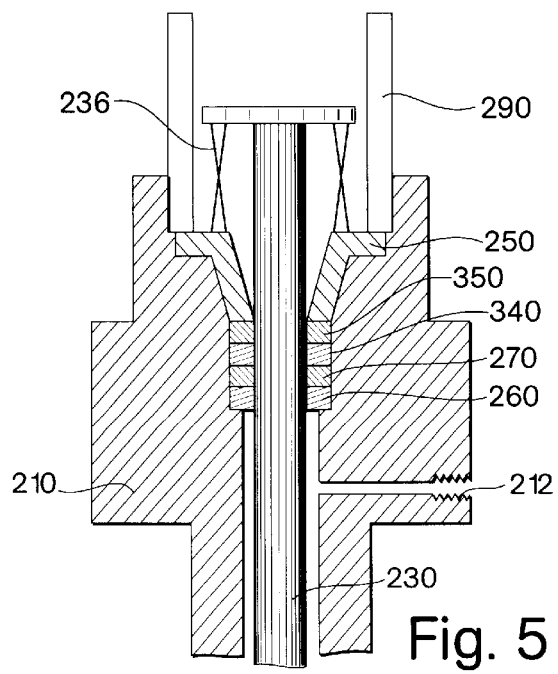
FIG. 5 illustrates in cross section, an enlarged view of the seal area of another embodiment of the invention.

FIG. 5 illustrates another embodiment in which a secondary seal is used to further isolate the high pressure fluid from the environment. In addition to lower washer 260 and initial seal 270, a secondary seal, O-ring 340, may be placed between the primary seal 270 and upper washer 350. The O-ring may be placed directly behind initial seal 270, or an intermediate washer or other spacer may be placed between the two seals. The O-ring may be composed of any material capable of withstanding the pressure, temperature and wear conditions encountered by the seal. For example, 0 ring 340 may be composed of PTFE or synthetic rubber, such as that sold under the trademark VITON® (DuPont Dow Elastomers, L.L.C.). Of course, tertiary and additional seals may also be incorporated if found to be useful in a specific machine, or process.

Referring back to FIG. 2, a chamber 312 defined within cylinder 311 above the pistons may be connected to a source of high pressure air, for example, air at 60 psi, in order to provide adequate force to piston stem 280 in order to close valve 200. Compression spring 316 may provide additional force to aid in the closure of the valve as high pressure gas entering inlet 212 can, in some arrangements, tend to push valve pin 230 upward. In order to open the valve, a similar amount of air pressure may be transmitted to chamber 312, and the force supplied in an upward direction from the compressed air, in combination with the force provided by the high pressure fluid entering the system at inlet 212, is great enough to overcome the force provided by spring 316, and therefore is able to quickly open the valve.

The valve may be operated at high pressures and temperatures, and materials of construction should be chosen appropriately. A temperature difference of 300, 500 or more than 600° F. between various parts of the valve may be encountered in some applications, including polymer processing applications. For instance, the valve may reach temperatures surpassing 600° F. near an injector body but be considerably cooler, for example, 140° F. near the air actuator. Parts subject to the conditions near the injector body should be made of suitable heat resistant material. This high temperature operation may preclude the use of polymeric valve seats and components, and metals or ceramics may be preferable. In addition, if the valve is used to control the flow of supercritical fluids (SCF), the fluid may act as a solvent and distort the polymer over time. Polymers may also be prone to particulate contamination, swelling, or distortion, due to heat. Metals are much less prone to these problems. In addition, it is preferred that the valve pin, seat and valve guide are of metal because the seat in preferred embodiments should be able to endure millions of impact cycles at high temperature, and the valve pin preferably is able to reciprocate continuously without galling. The choice of durable, heat resistant materials for the guide, valve pin and seat allow these components to be in close proximity to the polymer melt stream. Thus a valve comprising a seat, a guide and a valve pin of temperature resistant metal may be preferred in a high temperature application. The drive components, such as the piston and piston stem, may be placed farther from the heat source and thus may not be subjected to the same extreme conditions.

Valve seat 220 and valve pin 230 may be made of the same or different materials, however, to prevent galling, it is preferred that valve pin 230 be of a harder material than is valve seat 220. It is preferred that valve seat 220 is made of a hard material, however, so that metal particles are not embedded into the seat during operation. It is preferred that the valve seat and valve pin be made of resilient, heat-resistant materials such as hardened steel, alloys, ceramics or, possibly, in some applications, high-temperature polymers. For example, valve seat 220 may be made of H1150 17-4PH hardened steel having a Rockwell C hardness of about 33–36, while valve pin 230 may be made of tungsten carbide having a Rockwell C hardness of about 66 or greater.

Figure 6:
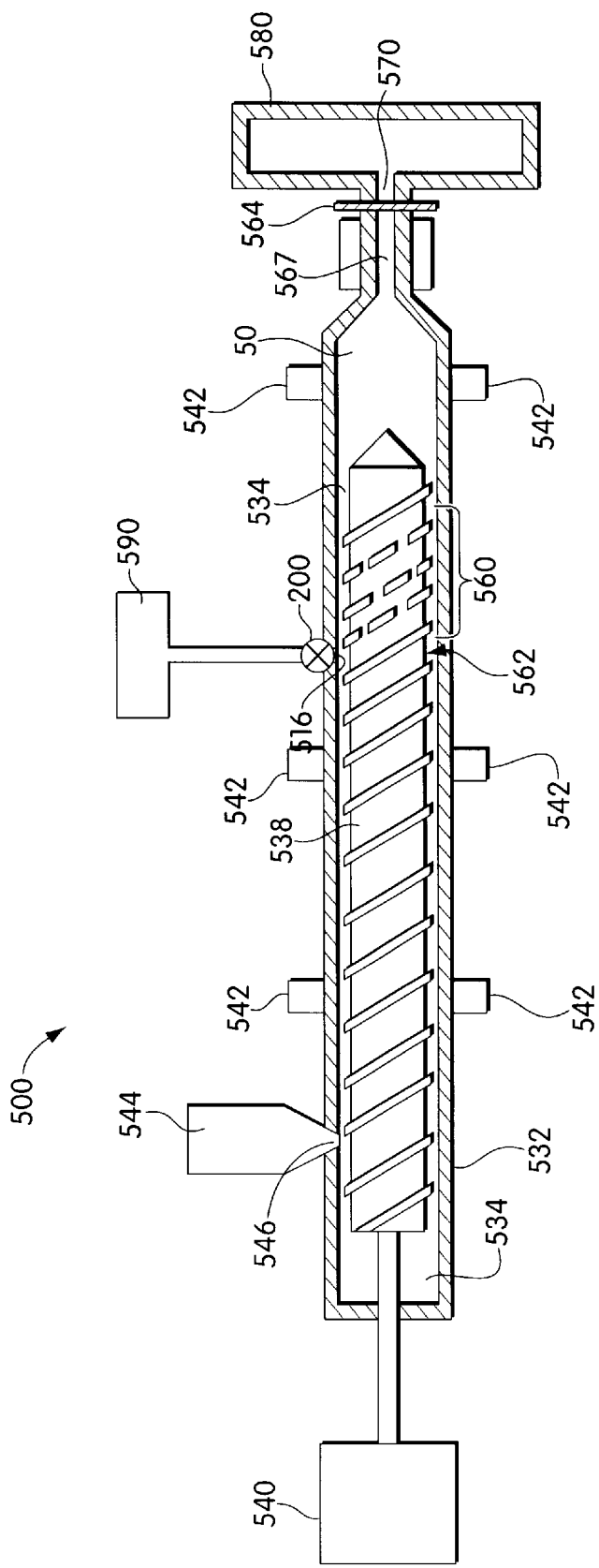
FIG. 6 illustrates in cross section, a view of an embodiment of a polymeric processing system according to the invention.

In one aspect, the valve of the present invention may be used with a polymeric foam processing apparatus such as a blow molding, injection molding or extrusion molding machine. In one embodiment, illustrated in FIG. 6, valve 200 is used in conjunction with injection molding system 500. The injection molding system includes a barrel 532 and a screw 538 contained in the barrel for moving and mixing polymer melt. Also provided is a drive motor 540 for driving the screw and a heating units 542 for maintaining the barrel at an elevated temperature. Polymeric material is provided in hopper 544 and is fed into the extruder 514 through orifice 546. A source 590 of blowing agent, which can be a supercritical fluid (SCF), is supplied to the extruder and the fluid flow is regulated by valve 200 which serves to selectively transport blowing agent from source 590 to blowing agent port 516, which communicates with polymer processing space 534. SCF may be received into blowing agent receiving section 562 and is mixed with polymer in mixing section 560. The mixture of polymer and blowing agent then passes through a nucleating pathway 567 and through outlet 570 into mold 580. Valve 200 may be synchronized with the action of gate 564 and screw 538 so that the supply of blowing agent is isolated from the extruder 514 when gate 564 is open. Valve 200 may be opened when it is desirable to add blowing agent to the polymer mix. Preferably, valve 200 is proximate polymer processing space 534, so that when the valve is closed, substantially all of the high pressure fluid in communication with the polymer has already entered the mixing section 560 of the extruder.

In such a configuration, valve 200 may be opened (see FIG. 2) to allow fluid, such as SCF, to pass through inlet 212 into cavity 214 and through outlet 240 in order to allow the fluid to mix with polymer. When the polymer is to be injected into a mold, a force, for example, high pressure air, is supplied to cavity 312, supplying a downward force on piston 310 and piston stem 280. The downward force is transferred to ball 320 which then provides a point source to drive end 234 of valve pin 230. Valve pin 230 is in turn driven downwardly until sealing end 232 is contacted with seat 220 in order to provide a fluid-tight seal. Once the fluid-tight seal is made, and the supply of high pressure fluid is cut off from exit 240, and polymer in the plastics production system may be injected into a mold cavity without the addition of, or interference from, the fluid.

When the molding cycle is complete and additional gas is desired to be mixed with new polymer material, a signal is sent to an actuator, and high pressure air, for example at 60 psi, is provided to chamber 314 within cylinder 311, below the piston, which is isolated by the piston from chamber 312.

The high pressure air in chamber 314 provides an upward force to piston 310 which in turn retracts attached piston stem 280 upwardly. With piston stem 280 retracted, spring 236 can provide an adequate force, optionally in combination with that provided by any high pressure fluid in communication with the valve, to move valve pin 230 and ball 320 upwardly until ball 320 is retained by shoulder 292 in gland 290. The amount of travel of pin 230 is controlled to be less than that which would be required for the pin to be fully extracted from valve pin guide 245. In this manner, the valve pin 230 remains in proper center alignment for seating with valve seat 220 during the next injection cycle. Once an adequate supply of high pressure fluid has passed through exit 240, the air source may be transferred from chamber 314 back to chamber 312 to reinitiate the closing process.

One feature of preferred embodiments of the invention is that a valve can include a piston that can move reciprocally to drive a valve pin into and out of a valve seat, where the piston is decoupled from the valve pin. That is, the piston is not operatively linked to the valve pin in a way that components connecting the piston with the valve pin affect alignment of the valve pin. Specifically, the piston drives a piston stem which, in turn, drives the valve pin (optionally via an auxiliary object such as a ball between the stem and pin), while the axes of the stem and pin are free to move relative to each other. One benefit of this is that the piston and stem do not affect alignment of the valve pin relative to the valve seat. This feature, in combination with a preferred, internally-tapered packing washer, allows maximal freedom of axial movement of the valve pin. The valve pin then can be guided, solely, by the valve pin guide, which will not come out of alignment relative to the valve seat, and the valve pin thus is assured of remaining in alignment with the valve seat.

Those skilled in the art would readily appreciate that all parameters listed herein are meant to be exemplary and that actual parameters would depend upon the specific systems with which the invention is used. It is, therefore, to be understood that the foregoing embodiments are presented by way of example only and that, within the scope of the appended claims and equivalents thereto, the invention may be practiced otherwise than as specifically described.

What is claimed:

1. A valve comprising:
   a valve seat;
   a valve pin capable of forming a fluid-tight seal with the valve seat;
   a valve pin guide adjacent the valve seat, the valve pin guide having an internal diameter that is substantially the same as the outer diameter of the valve pin;
   a packing washer supporting the valve pin, the packing washer having a first end and a second end, wherein an internal diameter of the packing washer varies between the first end and the second end; and
   a piston stem having first and second ends and configured to transfer axial force to the valve pin, the piston stem being uncoupled from the valve pin.

2. The valve of claim 1 wherein the packing washer is internally tapered.

3. The valve of claim 1 further comprising a ball loosely positioned between the second end of the piston stem and a drive end of the valve pin, the ball capable of transferring force from the piston stem to the valve pin.

4. The valve of claim 1 comprising a compression spring in contact with the valve pin, the compression spring providing a force directing the valve pin away from the valve seat.

5. The valve of claim 1 comprising a stop to limit the travel of the valve pin in a direction toward the piston stem.

6. The valve of claim 5 wherein the stop is positioned to limit the travel of the valve pin to less than about 0.10 inch.

7. The valve of claim 5 wherein the stop is positioned to limit the travel of the valve pin to less than about 0.05 inch.

8. The valve of claim 1 further comprising an energized seal surrounding a portion of the valve pin, the energized seal preventing flow of fluid past the seal.

9. The valve of claim 8 wherein the energized seal comprises a toroidal spring.

10. The valve of claim 8 wherein the energized seal is slideable in relation to the valve pin.

11. The valve of claim 8 further comprising a second energized seal.

12. The valve of claim 8 comprising a secondary seal wherein the secondary seal comprises an O-ring.

13. The valve of claim 1 comprising a compression spring in contact with the valve pin, the compression spring providing a force directing the valve pin away from the valve seat.

14. A polymer processing system comprising:
   an extruder including a barrel and a screw rotatable within the barrel, the barrel having a blowing agent port former therein; and
   a valve positioned between a blowing agent source and the blowing agent port, the valve comprising a valve seat, a valve pin capable of forming a fluid-tight seal with the valve seat, a valve pin guide adjacent the valve seat, the valve pin guide having an internal diameter that is substantially the same as the outer diameter of the valve pin, a packing washer supporting the valve pin, the packing washer having a first end and a second end, wherein an internal diameter of the packing washer varies between the first end and the second end, and a piston stem having first and second ends and configured to transfer axial force to the valve pin, the piston stem being uncoupled from the valve pin.

15. The system of claim 14 further comprising a mold connected to an outlet of the extruder.

* * * * *